United States Patent [19]

Eto

[11] 3,735,394

[45] May 22, 1973

[54] INTEGRATING A-D CONVERSION SYSTEM

[76] Inventor: Tetutaro Eto, No. 841-2 chome Soshigoya, Setagaya-ku, Tokyo, Japan

[22] Filed: Oct. 27, 1970

[21] Appl. No.: 84,399

[30] Foreign Application Priority Data

Oct. 30, 1969 Japan ................................44/86638

[52] U.S. Cl.......340/347 NT, 340/347 AD, 324/76 A

[51] Int. Cl..............................................H03k 13/20

[58] Field of Search .................340/347; 235/150.51, 235/183; 324/76 A; 328/127, 109

[56] References Cited

UNITED STATES PATENTS

| | | | |
|---|---|---|---|
| 3,462,759 | 8/1969 | Hoffman | 340/347 AD |
| 3,480,948 | 11/1969 | Lord | 340/347 NT |
| 3,500,384 | 3/1970 | Naydan et al. | 340/347 NT |
| 3,564,538 | 2/1971 | Bondzeit et al. | 340/347 NT |
| 3,566,265 | 2/1970 | Reid | 340/347 NT |
| 3,577,140 | 5/1971 | Aasnaes | 340/347 NT |
| 2,817,704 | 12/1957 | Huntley | 340/347 AD X |

FOREIGN PATENTS OR APPLICATIONS

| | | | |
|---|---|---|---|
| 1,805,099 | 8/1969 | Germany | 340/347 NT |

*Primary Examiner*—Charles D. Miller
*Attorney*—Marshall & Yeasting

[57] ABSTRACT

An integrating A–D conversion system which is adapted to provide an analog input voltage in the form of a binary-coded decimal digital output indicated by a code 8–4–2–1 and comprises the steps of (1) positively integrating a positive analog input voltage for a period of time 2T, (2) subtracting from the resulting voltage $-V_r$ in (1) a voltage produced by integrating a negative reference voltage for a period of time T, (3) adding the resulting voltage in (2) with a negative (or positive) voltage produced by integrating the voltage $-V_r$(or + $V_r$) for a period of time T/2 according as the resulting voltage in (2) is positive (or negative), (4) adding the resulting voltage in (3) with a negative (or positive) voltage produced by integrating the voltage $-V_r$(or + $V_r$) for a period of time T/4 according as the resulting voltage in (3) is positive (or negative), (5) adding the resulting voltage in (4) with a negative (or positive) voltage produced by integrating the voltage $-V_r$(or + $V_r$) for a period of time T/8 according as the resulting voltage in (4) is positive (or negative), (6) adding the resulting voltage in (5) with a negative (or positive) voltage produced by integrating the voltage $-V_r$(or + $V_r$) for a period of time T/8 according as the resulting voltage in (5) is positive (or negative), (7) obtaining a digital output representing the first digit of a binary-coded decimal number in the form of a four-bit code of "1" and "0" according as each of the resulting voltages in (2), (3), (4) and (5) is positive or negative, and (8) thereafter repeating the same operations as in (2) to (7) to obtain digital outputs representing a second, third, . . . digits in the form of binary-coded decimal numbers.

5 Claims, 9 Drawing Figures

INTEGRATING A-D CONVERSION SYSTEM

BACKGROUND OF THE INVENTION

Field of the Invention

This invention relates to an A–D conversion system, and more particularly to an integrating A–D conversion system which is adapted to convert an analog input voltage to the form of a binary-coded decimal digital output indicated by codes based upon first, second, third and fourth bits representative of weights 8, 4, 2 and 1 respectively.

SUMMARY OF THE INVENTION

This invention is to provide a novel integrating A–D conversion system which is adapted to provide an analog input voltage in the form of a binary-coded decimal digital output indicated by codes based upon first, second, third and fourth bits representative of weights 8, 4, 2 and 1 respectively and is especially designed to provide a binary-coded decimal digital output of respective digits in sequential integration processes.

DESCRIPTION OF THE PREFERRED EMBODIMENTS

Figure 1:
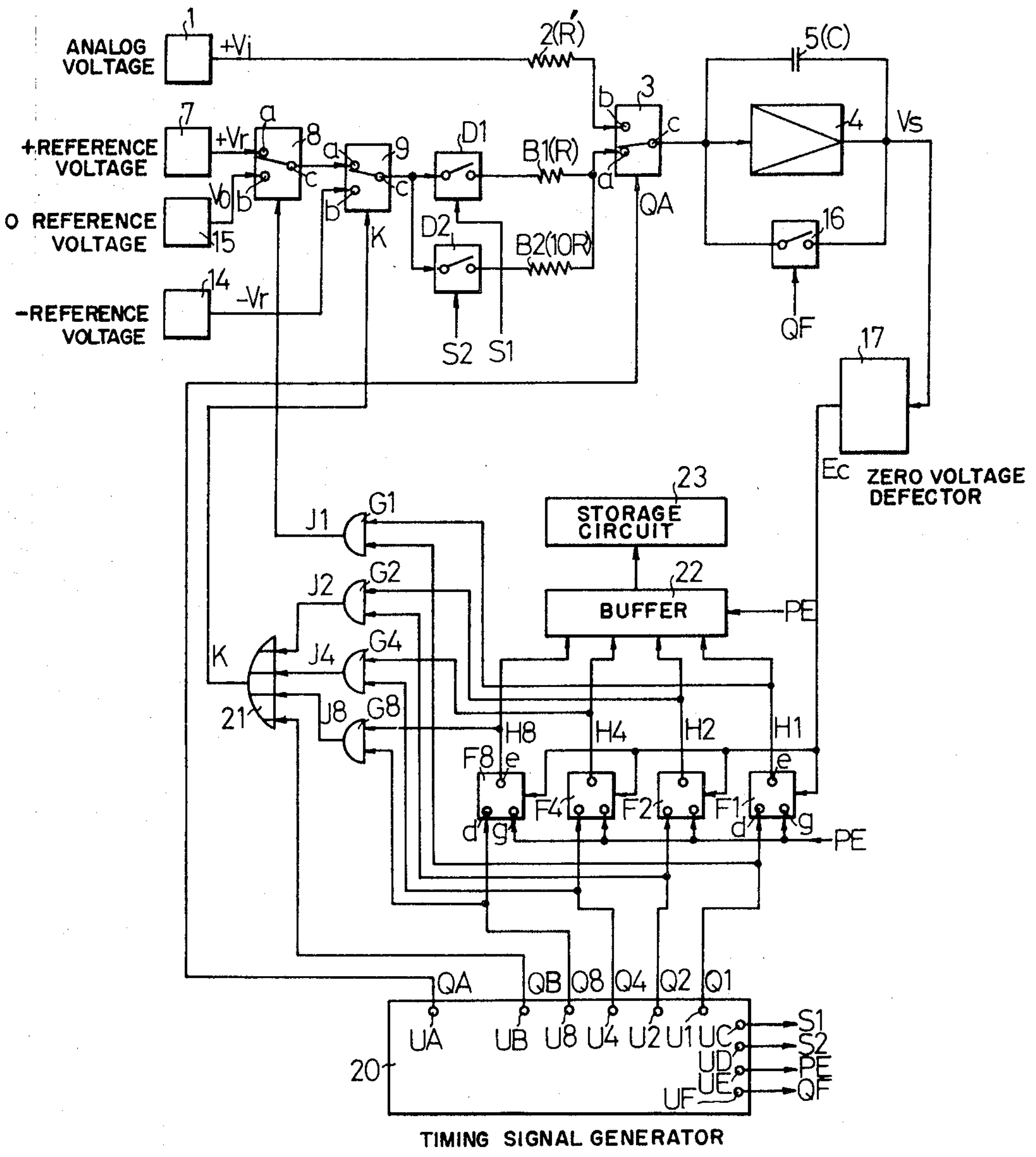
FIG. 1 is a block diagram illustrating one example of an integrating A–D conversion system of this invention.

With reference to the drawings embodiments of this invention will hereinafter be described in connection with the case where a binary-coded decimal number is indicated in the form of first to fourth bit codes respectively representing weights as "8," "4," "2" and "1" in decimal number as shown in the following table.

| | Bit | First | Second | Third | Fourth |
|---|---|---|---|---|---|
| Decimal Number | Weight | 8 | 4 | 2 | 1 |
| 0 | | 0 | 0 | 0 | 0 |
| 1 | | 0 | 0 | 0 | 1 |
| 2 | | 0 | 0 | 1 | 0 |
| 3 | | 0 | 0 | 1 | 1 |
| 4 | | 0 | 1 | 0 | 0 |
| 5 | | 0 | 1 | 0 | 1 |
| 6 | | 0 | 1 | 1 | 0 |
| 7 | | 0 | 1 | 1 | 1 |
| 8 | | 1 | 0 | 0 | 0 |
| 9 | | 1 | 0 | 0 | 1 |

A description will be given first of the embodiment exemplified in FIG. 1. In the figure reference numeral 1 indicates an analog voltage source, from which a positive analog voltage $+V_i$ is applied to the input side of an amplifier 4 through a resistor 2 having a resistance value R' and a fixed contact *b* and a movable contact *c* of a switching circuit 3. A capacitor 5 having a capacitance C is connected between the input and output sides of the amplifier 4, at the output side of which is derived an integrated output produced by positively integrating the analog voltage $+V_i$ with the resistance value of the resistor 2 and the capacitance of the capacitor 5 being used as integration constants respectively.

Reference numeral 7 designates a positive reference voltage source, from which a positive reference voltage $+V_r$ is supplied to the input side of the amplifier 4 through fixed contact *a* and movable contact *c* of a switching circuit 8; and movable contact *c* of the switching circuit 3. At the output side of the amplifier 4 there is derived an integrated output which is produced by positively integrating the reference voltage $+V_r$ with the resistance value of the resistors B1 or B2 and the capacitance of the capacitor 5 being used as integration constants.

Reference numeral 14 identifies a negative reference voltage source, from which a negative reference voltage $-V_r$ is fed to the input side of the amplifier 4 through a fixed contact *b* and the movable contact *c* of the switching circuit 9, either the switch D1 and resistor B1 or the switch D2 and the resistor B2; and the contacts *a* and *c* of the switching circuit 3. At the output side of the amplifier 4 there is derived an integrated output which is produced by negatively integrating the reference voltage $-V_r$ with the resistance values of the resistors B1 or B2 and the capacitors 5 being used as integration constants.

Reference numeral 15 designates a zero reference voltage source from which a zero voltage $V_o$ is applied to the input side of the amplifier 4 through a fixed contact *b* and the movable contact *c* of the switch 8; the contacts *a* and *c* of the switch 9; either the switch D1 and the resistor B1 or the switch D2 and the resistor B2; and the contacts *a* and *c* of the switch 3. In this case, however, the zero voltage $V_o$ is neither positively nor negatively integrated, so that the output at the output side of the amplifier 4 is not changed.

Reference numeral 16 indicates a switch connected in parallel with the capacitor 5 for reducing the integrated output to zero.

Reference numeral 17 identifies a comparator circuit which is connected to the output side of the amplifier 4 and compares the integrated output voltage $V_s$ derived from the amplifier 4 with the zero reference voltage whether the former is positive or negative relative to the latter. The comparator circuit 17 is adapted to produce a compared output $E_c$ which is indicated by "1" or "0" according as the integrated output voltage $V_s$ is positive or negative.

Figure 2:
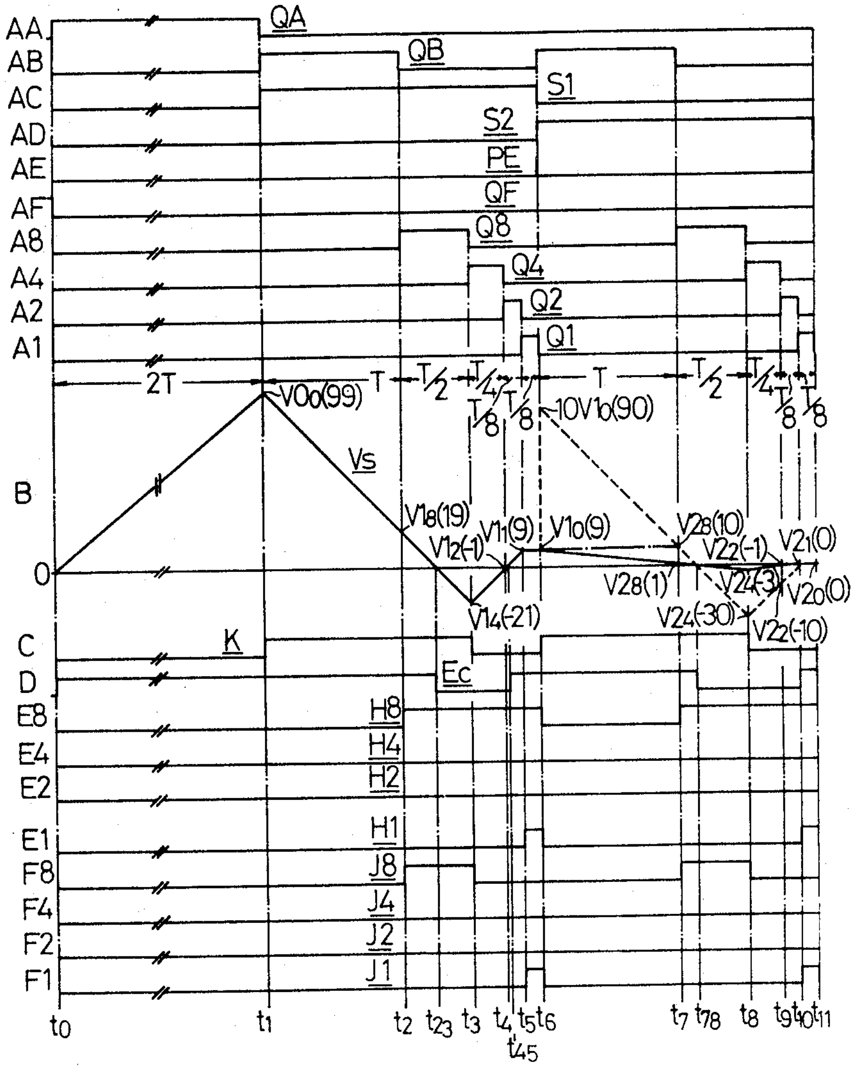
FIGS. 2 and 3 are waveform diagrams for explaining the system exemplified in FIG. 1.

Reference numeral 20 indicates a timing signal generator circuit which produces timing signals at times $t_0$, $t_1, t_2, \ldots t_{11}$. The periods of time between $t_0$ and $t_1$, between $t_1$ and $t_2$, between $t_2$ and $t_3$, between $t_3$ and $t_4$, between $t_4$ and $t_5$ and between $t_5$ and $t_6$ are respectively selected 2T, T, T/2, T/4, T/8 and T/8, while the periods of time between the times $t_6$ and $t_7$, between $t_7$ and $t_8$, between $t_8$ and $t_9$, between $t_9$ and $t_{10}$ and between $t_{10}$ and $t_{11}$ are respectively selected T, T/2, T/4, T/8 and T/8. The timing signal generator circuit 20 is designed to derive a rectangular wave QA of the level "1" such as shown in FIG. 2–AA from a terminal UA between the times $t_0$ and $t_1$, a rectangular wave QB of the level "1" such as depicted in FIG. 2–AB from a terminal UB between the times $t_1$ and $t_2$ and between $t_6$ and $t_7$, a rectangular wave Q8 of the level "1" such as shown in FIG. 2–A8 from a terminal U8 between the times $t_2$ and $t_3$ and between $t_7$ and $t_8$, a rectangular wave Q4 of the level "1" such as depicted in FIG. 2–A4 from a terminal U4 between the times $t_3$ and $t_4$ and between $t_8$ and $t_9$, a rectangular wave Q2 of the level "1" such as shown in FIG. 2–A2 from a terminal U2 between the times $t_4$ and $t_5$ and between the times $t_9$ and $t_{10}$, a rectangular wave Q1 of the level "1" such as depicted in FIG. 2–A1 from a terminal U1 between the times $t_5$ and $t_6$ and between $t_{10}$ and $t_{11}$, a rectangular wave S1 of the level "1" such as illustrated in FIG. 2–AC from a terminal UC between the times $t_1$ and $t_6$, a rectangular wave of the level "1" such as shown in FIG. 2–AD from a terminal UD between the times $t_6$ and $t_{11}$, a carry pulse PE of the level "1" such as depicted in FIG. 2–AE from a terminal UE at the times $t_6$ and $t_{11}$ and a rectangular wave QF of the level "1" such as illustrated in FIG. 2–AF from a terminal UF before the time $t_0$.

The rectangular wave QA is applied to the switching circuit 3 to control it so that its contact *c* lies on the contact *b* while the rectangular wave QA is at the level "1" and that the contact *c* lies on the contact *a* while the rectangular wave is at the level "0."

The rectangular wave QB is supplied to an OR circuit 21. The rectangular wave S1 is fed to the switch D1 to hold it in the on state while the rectangular wave S1 is at the level "1." Further, the rectangular wave S2 is applied to the switch D2 to hold it in the on state while the rectangular wave S2 is at the level "1."

The rectangular waves Q8, Q4, Q2 and Q1 are respectively fed to set terminals *d* of flip-flop circuits F8, F4, F2 and F1. While, these flip-flop circuits F8, F4, F2 and F1 are supplied with the compared output $E_c$ and when the output $E_c$ is at the level "1" the flip-flop circuits F8, F4, F2 and F1 are respectively set at the times $t_2$, $t_3$, $t_4$ and $t_5$ and $t_7$, $t_8$, $t_9$ and $t_{10}$ corresponding to the leading edges of the rectangular waves Q8, Q4, Q2 and Q1. The carry pulse PE is fed to reset terminals *g* of the flip-flop circuits F8, F4, F2 and F1 to change the level of their outputs H8, H4, H2 and H1 to the level "0," if these outputs are at the level "1." Accordingly, outputs H8, H4, H2 and H1 of the flip-flop circuits F8, F4, F2 and F1 are derived at their output terminals *e* in the form of "1" from the times $t_2$, $t_3$, $t_4$ and $t_5$ to $t_6$ and from the times $t_7$, $t_8$, $t_9$ and $t_{10}$ to $t_{11}$ respectively. When the compared output $E_c$ is at the level "0," the flip-flop circuits F8, F4, F2 and F1 are not set by the rectangular waves Q8, Q4, Q2 and Q1 respectively, so that the outputs H8, H4, H2 and H1 are derived in the form of "0" from the times $t_2$, $t_3$, $t_4$ and $t_5$ to $t_6$ and from the times $t_7$, $t_8$, $t_9$ and $t_{10}$ to $t_{11}$ respectively.

The flip-flop circuits F8, F4, F2 and F1 respectively correspond to the first to fourth bits of a binary-coded decimal number, so that the outputs H8, H4, H2 and H1 are applied to a buffer circuit 22 as digital outputs of the each digit of the decimal number. While, the buffer circuit 22 is supplied with the digit pulse PE produced at the times $t_6$ and $t_{11}$ and, based upon the pulse PE, the digital outputs due to the outputs of the flip-flop circuits F8, F4, F2 and F1 are supplied to a memory or storage circuit 23.

Further, the outputs H8, H4, H2 and H1 are respectively applied to AND circuits G8, G4, G2 and G1, which are respectively supplied with the rectangular waves Q8, Q4, Q2 and Q1 and whose outputs J8, J4, J2 and J1 are respectively fed to the OR circuit 21.

The output K of the OR circuit 21 is applied to the switching circuit 9 to control it in such a manner that its contact *c* is held on the contact *b* while the output K is at the level "1" and on the contact *a* while the output K is at the level "0." Further, the output J1 of the AND circuit G1 is fed to the switching circuit 8 to control it in such a manner as to hold its contact *c* on the contact *b* while the output J1 is at the level "1" and on the contact *a* while the output J1 is at the level "0." The rectangular wave QF is applied to the switch 16 to hold it on while the rectangular wave QF is at the level "1."

The foregoing has described the construction of one example of this invention, which will be further described together with its operation. Since the switch 16 is closed by the rectangular wave QF before the time $t_0$, the integrated output $V_s$ is zero. Let it be assumed that before the time $t_0$ the flip-flop circuits F8, F4, F2 and F1 are reset, and accordingly the outputs H8, H4, H2 and H1 are at the level "0."

Under such conditions, at the time $t_0$ the level of the rectangular wave QF becomes "0" to open the switch 16 and the level of the rectangular wave QA becomes "1," so that positive integration of the analog voltage $+V_i$ is initiated with an integrator formed with the resistor 2, the capacitor 5 and the amplifier 4 and this integration continues until the time $t_1$ when the level of the rectangular wave QA becomes "0."

In this case, the integration is achieved based upon the following equation.

$$\frac{1}{R'C}\int_0^{2T} V_i dt = V0_0 \qquad (1)$$

where C is the capacitance of the capacitor 5, R′ the resistance value of the resistor 2 and $2T$ the period of time between the times $t_0$ and $t_1$. Therefore, the value of the integration output $V_s$ at the time $t_1$ is $V0_0$ volt given by the equation (1).

For convenience of explanation, let it be assumed that the value $V0_0$ given by the equation (1) is $+V_i$ such as +99 volts. In such a case, the integrated output $V_s$ increases from the zero voltage at the time $t_0$ and has a value such that $V0_0 = +99$ (volts) at the time $t_1$ as shown in FIG. 2–B.

At the time $t_1$ the level of the rectangular wave QA becomes "0" to bring the contact *c* of the switch 3 to the contact *a* and the level of the rectangular wave S1 becomes "1" to close the switch D1. Further, the level of the rectangular wave QB becomes "1" and is applied to the OR circuit 21, whose output K becomes to the level "1" as depicted in FIG. 2–C to thereby bring the contact *c* of the switching circuit 9 to its contact *b*. As a result of this, negative integration of the reference voltage $-V_r$ is initiated with an integrator constituted with the resistor B1, the capacitor 5 and the amplifier 4 and this integration continues until the time $t_2$ when the level of the rectangular wave QB becomes "0."

The integration in this case is carried out based upon the following equation $$-\frac{1}{RC}\int_0^{T} V_r dt = V_8 \qquad (2)$$

where R is the resistance value of the resistor B1, C the capacitance of the capacitor 5 and $T$ the period of time between the times $t_1$ and $t_2$. Therefore, the value $VI_8$ of the integrated output $V_s$ at the time $t_2$ is given as follows:

$$VI_8 = V0_0 - V_8 \qquad (3)$$

Accordingly, if $|-V_r|$, the resistance value $R$ and the capacitance $C$ are preselected so that the value $V_8$ of the equation (2) may be 80 (volts), the integrated output $V_s$ becomes smaller than 99 (volts) at the time $t_1$ and has a value such that $V1_8 = 99 - 80 = 19$ (volts) at the time $t_2$ as illustrated in FIG. 2–B.

At the time $t_2$ the rectangular wave QB goes to the level "0" and the rectangular wave Q8 goes to the level "1." While, the integrated output $V_s$ is positive from the time $t_0$ to $t_2$, so that the output $E_c$ of the comparator circuit 17 is at the level "1" between the times $t_0$ and $t_2$ as depicted in FIG. 2–D. Accordingly, the flip-flop circuit F8 is set at the time $t_2$ to change its output H8 to the level "1" as shown in FIG. 2–E8 and hence becomes the output J8 of the AND circuit G8 to the level "1" at the time $t_2$ as shown in FIG. 2–F8. The output J8 is applied to the OR circuit 21 and its output K becomes at the level "1" after the time $t_2$, too, as illustrated in FIG. 2–C, so that the contact $c$ of the switch 9 is continuously kept on its contact $b$. As a result of this, the reference voltage $-V_r$ is integrated in the same manner as that described above and this integration is achieved until the time $t_3$ when the level of the output J8 becomes "0" by the changing of the level of the rectangular wave Q8 to "0."

Since the period of time between the times $t_2$ and $t_3$ is $T/2$, the integration is accomplished based upon the following equation.

$$-\frac{1}{RC}\int_0^{\frac{T}{2}} V_r dt = -\frac{V_8}{2} = -V_4 \qquad (4)$$

Therefore, the value $V1_4$ of the integrated output $V_s$ at the time $t_3$ is given as follows:

$$V1_4 = V1_8 - V_4 \qquad (5)$$

By the way, since $V_4$ is 40 (volts), the integrated output $V_s$ becomes smaller than 19 volts at the time $t_2$ and has a value such that $V1_4 = 19 - 40 = -21$ (volts) at the time $t_3$ as depicted in FIG. 2–B.

At the time $t_3$ the rectangular wave Q8 goes to the level "0" and the rectangular wave Q4 goes to the level "1." While, the integrated output $V_s$ becomes negative from a time $t_{23}$ intermediate between the times $t_2$ and $t_3$, so that the output $E_c$ of the comparator circuit 17 goes to the level "0." Accordingly, the flip-flop circuit F4 is not set and its output H4 remains at the level "0" as shown in FIG. 2–E4 and the output J4 of the AND circuit G4 also remains at the level "0" as depicted in FIG. 2–F4. This causes the output K of the OR circuit 21 to be at the level "0" to change over the contact $c$ of the switch 9 to its contact $a$ and the reference voltage $+V_r$ is integrated until the time $t_4$ when the rectangular wave Q4 goes to the level "0."

Since the period of time between the times $t_3$ and $t_4$ is $T/4$, the above integration is carried out based upon the following equation.

$$\frac{1}{RC}\int_0^{\frac{T}{4}} V_r dt = \frac{V_8}{4} = \frac{V_4}{2} = V_2 \qquad (6)$$

Therefore, the value $V1_2$ of the integrated output $V_s$ at the time $t_4$ is given as follows:

$$V1_2 = V1_4 + V_2 \qquad (7)$$

Since $V_2$ is 20 volts, the integrated output $V_s$ increases from −21 (volts) at the time $t_3$ and has a value such that $V1_2 = -21 + 20 = -1$ (volt) at the time $t_4$ as illustrated in FIG. 2–B.

At the time $t_4$ the rectangular wave Q4, goes to the level "0" and the rectangular wave Q2 goes to the level "1" but the output $E_c$ of the comparator circuit 17 still remains at the level "0." Therefore, the flip-flop circuit F2 is not set and its output H2 remains at the level "0" as shown in FIG. 2–E2 and the output J2 of the AND circuit G2 is also at the level "0." Consequently, the output K of the OR circuit 21 continues to be at the level "0" to hold the contact $c$ of the switching circuit 9 on its contact $a$ and the reference voltage $+V_r$ is integrated until the time $t_5$ when the rectangular wave Q2 goes to the level "0."

Since the period of time between the times $t_4$ and $t_5$ is $T/8$, the above integration is achieved based upon the following equation.

$$\frac{1}{RC}\int_0^{\frac{T}{8}} V_r dt = \frac{V_8}{8} = \frac{V_4}{4} = \frac{V_2}{2} = V_1 \qquad (8)$$

Therefore, the value $V1_1$ of the integrated output $V_s$ at the time $t_5$ is as follows:

$$V1_1 = V1_2 + V_1 \qquad (9)$$

Since $V_1$ is 10 (volts), the integrated output $V_s$ becomes greater than −1 (volt) at the time $t_4$ and has a value such that $V1_1 = -1 + 10 = 9$ (volts) at the time $t_5$.

At the time $t_5$ the rectangular wave Q2 goes to the level "0" and the rectangular wave Q1 goes to the level "1." While, the integrated output $V_s$ becomes positive at a time $t_{45}$ intermediate between the times $t_4$ and $t_5$ and the output $E_c$ of the comparator circuit 17 goes to the level "1," so that the output H1 of the flip-flop circuit F1 is changed to the level "1" and the output J1 of the AND circuit G1 also goes to the level "1" to thereby bring the contact $c$ of the switch 8 to its contact $b$. In this case, since the output K of the OR circuit 21 is at the level "0," the contact $c$ of the switch 9 remains on the contact $a$ and the zero voltage $V_0$ is integrated until the time $t_6$. Since the period of time between the times $t_5$ and $t_6$ is $T/8$, the integration is carried out based upon the following equation.

$$\frac{1}{RC}\int_0^{\frac{T}{8}} V_0 dt = V_0 \qquad (10)$$

Therefore, the value $V1_0$ of the integrated output $V_s$ at the time $t_6$ is as follows:

$$V1_0 = V1_1 + V_0 \qquad (11)$$

$V_0$ is zero (volt), so that the value of the integrated output $V_s$ remains unchanged and has a value such that $V1_0 = 9$ (volts) at the time $t_6$.

Thus, at the time $t_6$ the output H8 and H1 are "1" and the output H4 and H2 are "0" and, based upon the carry pulse PE, these outputs are applied through the buffer circuit 22 to the memory circuit 23 at the time $t_6$ to be memorized or stored therein. This memory represents "1001" in binary-coded decimal number, from which it is known that "9" in decimal number is stored. Accordingly, it is know that the most significant digit of the analog voltage $V_i$ is "9" in decimal number.

Once the most significant digit of the analog voltage $V_i$ has been known to be "9" in decimal number, the flip-flop circuits F8, F4, F2 and F1 are reset based upon the pulse PE and then similar operations to those achieved from the time $t_1$ to $t_6$ are carried out from the time $t_6$. In this case, however, although not described in detail, the switch D1 is turned off by the rectangular wave S1 and the switch D2 is turned on by the rectangular wave S2 and integration is achieved employing the resistor B2, as will be apparent from FIG. 2. In the end, the resistance value used as an integration constant becomes 10R, by which the integration between the times $t_6$ and $t_7$ is accomplished based on the following equation.

$$-\frac{1}{10RC}\int_0^T V_r dt = -\frac{V_8}{10} \qquad (12)$$

and the value $V2_8$ if the integrated output $V_s$ at the time $t_7$ is given as follows:

$$V2_8 = V1_0 - V_8/10 \qquad (13)$$

and $V2_8 = 9 - 8 = 1$ (volt). The integration between the times $t_7$ and $t_8$ is achieved based upon the following equation.

$$-\frac{1}{10RC}\int_0^{\frac{T}{2}} V_r dt = -\frac{V_4}{10} \qquad (14)$$

and the value $V2_4$ of the integrated output $V_s$ at the time $t_8$ is given as follows:

$$V2_4 = V2_8 - V_4/10 \qquad (15)$$

and $V2_4 = 1 - 4 = -3$ (volts). The integration between the times $t_8$ and $t_9$ is carried out based upon the following equation.

$$\frac{1}{10RC}\int_0^{\frac{T}{4}} V_r dt = \frac{V_2}{10} \qquad (16)$$

and the value $V2_2$ of the integrated output $V_s$ at the time $t_9$ is given as follows:

$$V2_2 = V2_4 + V_2/10 \qquad (17)$$

and $V2_2 = -3 + 2 = -1$ (volt). The integration between the times $t_9$ and $t_{10}$ is effected based upon the following equation.

$$\frac{1}{10RC}\int_0^{\frac{T}{8}} V_r dt = \frac{V_1}{10} \qquad (18)$$

and the value $V2_1$ of the integrated output at the time $t_7$ is given as follows:

$$V2_1 = V2_2 + V_1/10 \qquad (19)$$

and $V2_1 = -1 + 1 = 0$ (volt). The integration between the times $t_{10}$ and $t_{11}$ is achieved based upon the following equation.

$$\frac{1}{10RC}\int_0^{\frac{T}{8}} V_0 dt = V_0 \qquad (20)$$

and the value $V2_0$ of the integrated output $V_s$ at the time $t_{11}$ is given as follows:

$$V2_0 = V2_1 + V_0 \qquad (21)$$

and $V2_0 = 0 + 0 = 0$ (volt).

In this case, the outputs H8, H4, H2 and H1 are respectively "1," "0," "0" and "1" and these outputs are supplied through the buffer circuit 22 to the memory circuit 23 based upon the pulse PE at the time $t_{11}$ and memorized therein. Thus, it is known that the digit immediately following the most significant digit of the analog voltage $V_i$ is "9" in decimal number.

Accordingly, it is known from the most significant digit "9" detected at the time $t_6$ and the digit "9" immediately following the most significant digit detected at the time $t_{11}$ that the analog voltage $V_i$ is 99 (volts).

Figure 3:
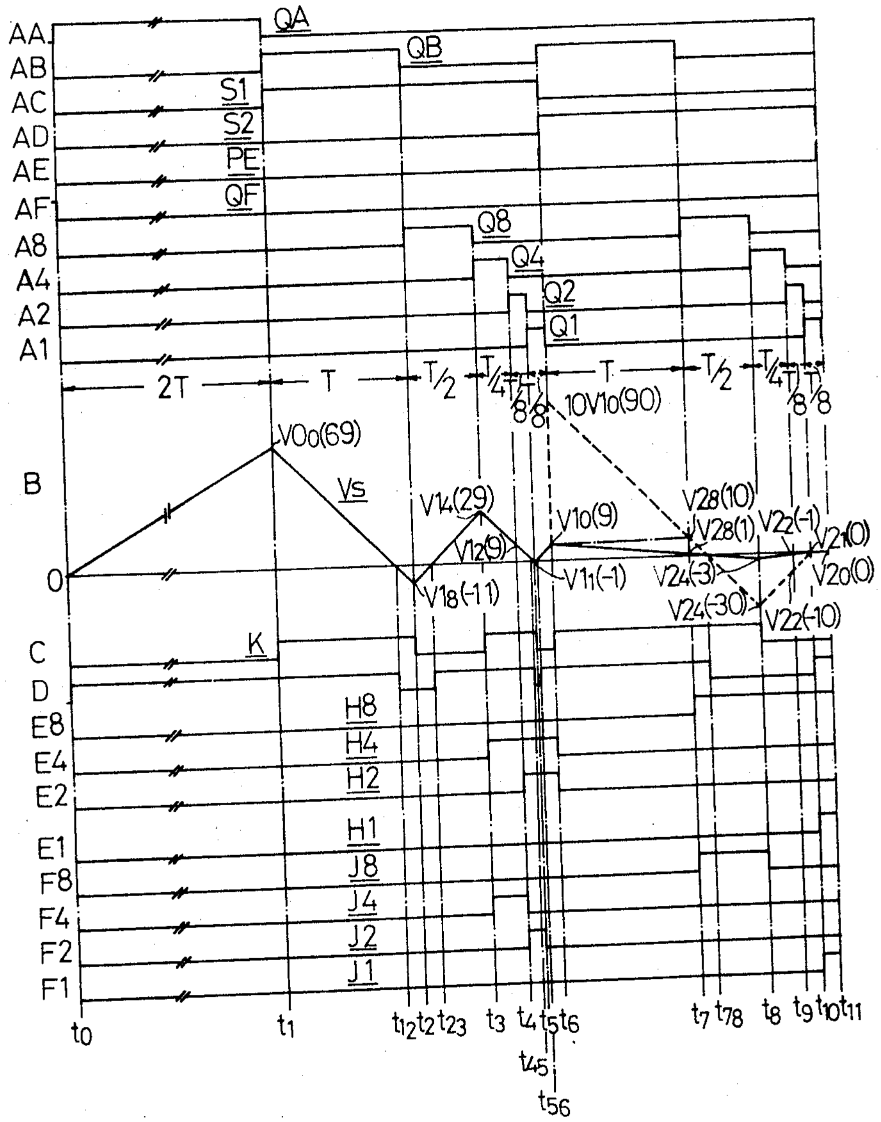

The foregoing has described the operation of the A–D converter shown in FIG. 1 in connection with the case where the analog voltage $V_i$ is 99 (volts). FIG. 3 shows the operation of the A–D converter of FIG. 1 in the event that the analog voltage $V_i$ is 69 (volts).

In the present example, at the time $t_1$ the value $V0_0$ of the integrated output $V_s$ is +69 (volts) based upon the following equation.

$$\frac{1}{R'C}\int_0^{2T} V_i dt = V0_0 \qquad (22)$$

At the time $t_2$ the value $V1_8$ of the integrated output $V_s$ is such that $V1_8 = V0_0 - V8 = +69 - 80 = -11$ (volts) based upon the following equation.

$$-\frac{1}{RC}\int_0^T V_r dt = -V_8 \qquad (23)$$

At the time $t_3$ the value $V1_4$ of the integrated output $V_s$ is such that $V1_4 = V1_8 + V_4 = -11 + 40 = +29$ (volts) based upon the following equation.

$$\frac{1}{RC}\int_0^{\frac{T}{2}} V_r dt = +V_4 \qquad (24)$$

At the time $t_4$ the value $V1_2$ of the integrated output $V_s$ is such that $V1_2 = V1_4 - V_2 = 29 - 20 = 9$ (volts) based upon the following equation.

$$-\frac{1}{RC}\int_0^{\frac{1}{4}} V_r dt = -V_2 \qquad (25)$$

At the time $t_5$ the value $V1_1$ of the integrated output $V_s$ is such that $V1_1 = V1_2 - V_1 = 9 - 10 = -1$ (volt) based upon the following equation.

$$-\frac{1}{RC}\int_0^{\frac{T}{8}} V_r dt = -V_1 \qquad (26)$$

At the time $t_6$ the value $V1_0$ of the integrated output $V_s$ is such that $V1_0 = V1_1 + V_1 = -1 + 10 = +9$ (volts) based upon the following equation.

$$\frac{1}{RC}\int_0^{\frac{T}{8}} V_r dt = V_1 \qquad (27)$$

Thus, at the time $t_6$ the outputs H4 and H2 are "1" and the outputs H8 and H1 are "0," so that a code "0110" is memorized in the memory circuit 23, from which it is known that "6" in decimal number is memorized therein and that this number is the most significant digit in decimal number and "6."

At the time $t_7$ the value $V2_8$ of the integrated output $V_s$, based upon the equation (12), is given by the equation (13) such that $9 - 8 = +1$ (volt). At the time $t_8$ the value $V2_4$ of the integrated output $V_s$, based upon the equation (14), is given by the equation (15) such that $1 - 4 = -3$ (volts). At the time $t_9$ the value $V2_2$ of the integrated output $V_s$, based upon the equation (16), is given by the equation (17) such that $-3 + 2 = -1$ (volt). At the time $t_{10}$ the value $V2_1$ of the integrated output $V_s$, based upon the equation (18), is given by the equation (19) such that $-1 + 1 = 0$ (volt). At the time $t_{11}$ the value $V2_0$ of the integrated output $V_s$, based upon the equation (20), is given by the equation (21) such that $0 + 0 = 0$ (volt).

Thus, at the time $t_{11}$ the outputs H8 and H1 are "1" and the outputs H4 and H2 are "0," and accordingly a code "1001" is memorized in the memory circuit 23, from which it is known that "9" in decimal number is memorized and that the digit immediately following the most significant digit is "9."

Consequently, it is known that the analog voltage $V_i$ is 69 (volts) at the time $t_{11}$.

While, the foregoing description has been given in connection with the cases that the analog voltage $V_i$ is 99 (volts) and 69 (volts), an analog input voltage $V_i$ can be similarly obtained in the form of a digital output of two figures in decimal number, so long as the voltage is less than 100 (volts).

Further, the foregoing description has been made of the cases where the analog voltage $V_i$ is positive but it will be understood that also when the analog voltage is negative, exactly the same operational effect as above described can be obtained on the assumption that the output $E_c$ of the comparator circuit 17 can be obtained in opposite polarity to the aforementioned.

Figure 4:
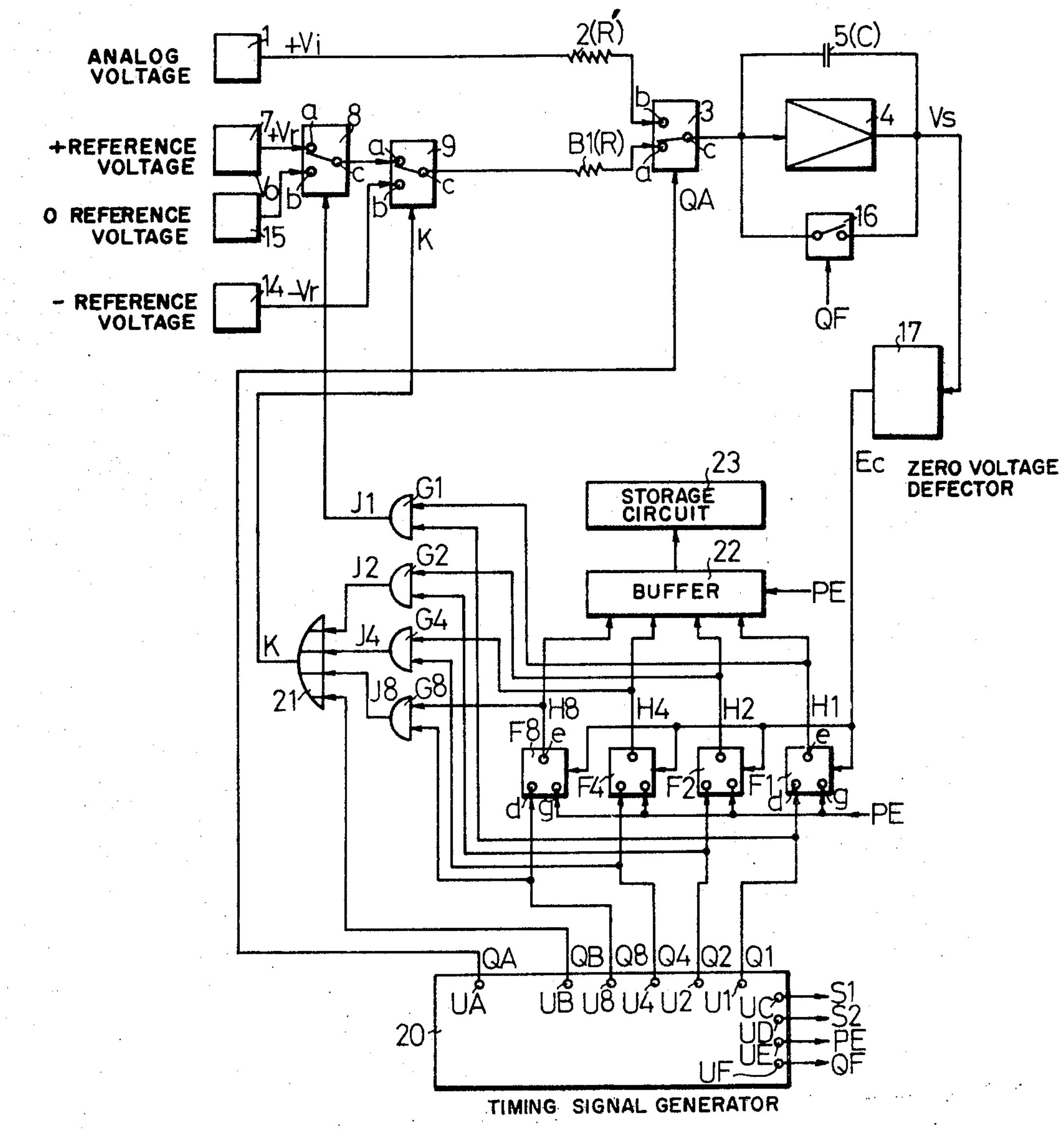
FIG. 4 is a block diagram showing a modified form of the integrating A–D conversion system of this invention.
Figure 5:
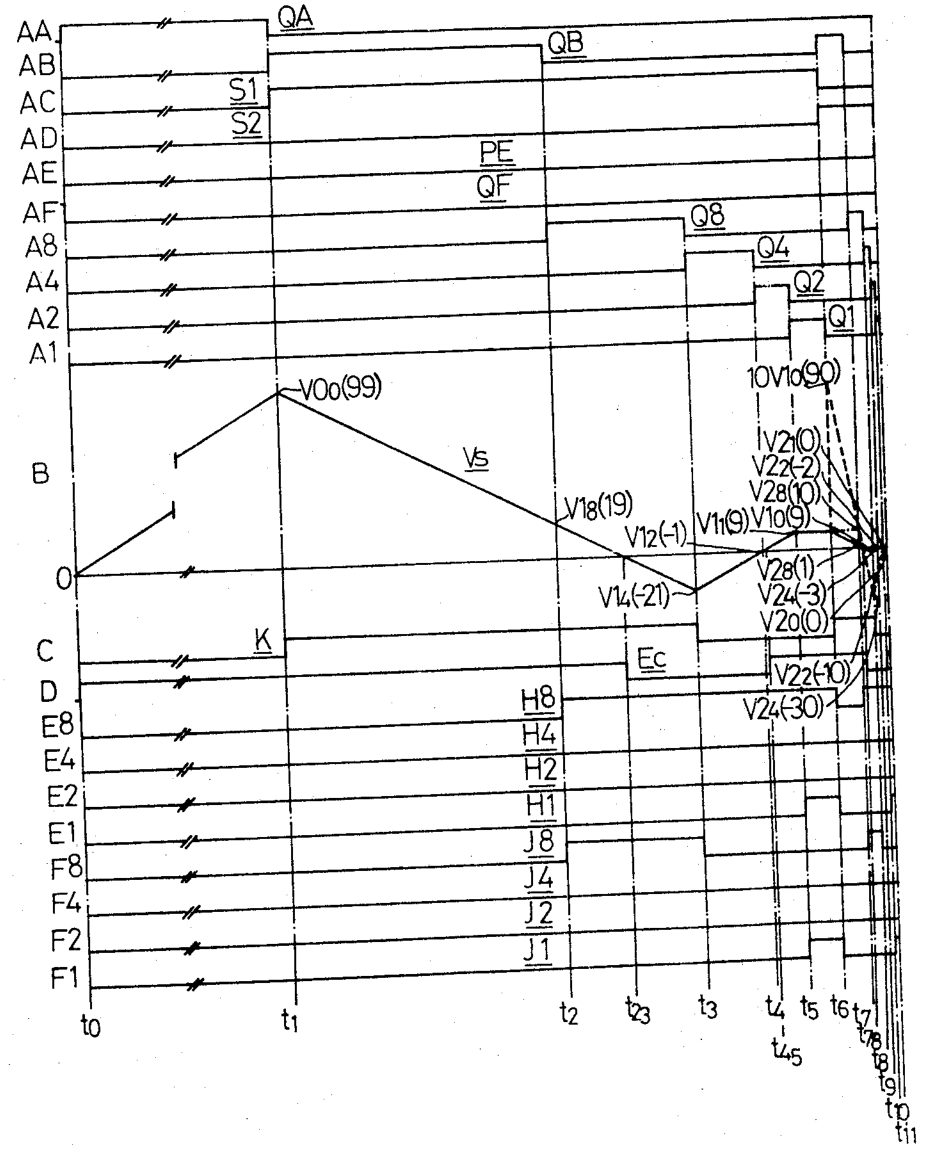
FIGS. 5 and 6 are waveform diagrams for explaining the system depicted in FIG. 4.

Turning now to FIG. 4, another modified form of this invention will hereinbelow be described. The present example is identical with that of FIG. 1 except in that the switches D1 and D2 and the resistor B2 are left out, and consequently the contact *c* of the switch 9 is always connected through the resistor B1 to the contact *a* of the switch 3 and that the time intervals of the signals derived from the timing signal generator circuit 20, that is, the periods of time between the times $t_6$ and $t_7$, between $t_7$ and $t_8$, between $t_8$ and $t_9$, $t_9$ and $t_{10}$ and between $t_{10}$ and $t_{11}$ are respectively $T/10$, $T/20$, $T/40$, $T/80$ and $T/80$. Accordingly, elements corresponding to those in FIG. 1 are marked with the same reference numerals and characters and will not be described in detail. In the event that the analog voltage $V_i$ is ultimately 99 (volts) as above described, the values $V0_0$, $V1_8$, $V1_4$, $V1_2$, $V1_1$ and $V1_0$ of the integrated output $V_s$ at the times $t_1$, $t_2$, $t_3$, $t_4$, $t_5$ and $t_6$ are respectively +99, +19, −21, −1, +9 and +9 (volts) based upon the equations (1), (2), (4), (6), (8) and (10) respectively as depicted in FIG. 5. The values $V2_8$, $V2_4$, $V2_2$, $V2_1$ and $V2_0$ of the integrated output $V_s$ at the times $t_7$, $t_8$, $t_9$, $t_{10}$ and $t_{11}$ are respectively obtained to be +1, −3, −1, 0 and 0 (volts) based upon the following equations.

$$-\frac{1}{RC}\int_0^{\frac{T}{10}} V_r dt = -\frac{V_8}{10} \qquad (28)$$

$$-\frac{1}{RC}\int_0^{\frac{T}{20}} V_r dt = -\frac{V_4}{10} \qquad (29)$$

$$\frac{1}{RC}\int_0^{\frac{T}{40}} V_r dt = -\frac{V_2}{10} \qquad (30)$$

$$\frac{1}{RC}\int_0^{\frac{T}{80}} V_r dt = -\frac{V_1}{10} \qquad (31)$$

$$\frac{1}{RC}\int_0^{\frac{T}{80}} V_0 dt = -V_0 \qquad (32)$$

and it is known that the analog voltage $V_i$ is 99 (volts) as in the case of FIG. 1.

Figure 6:
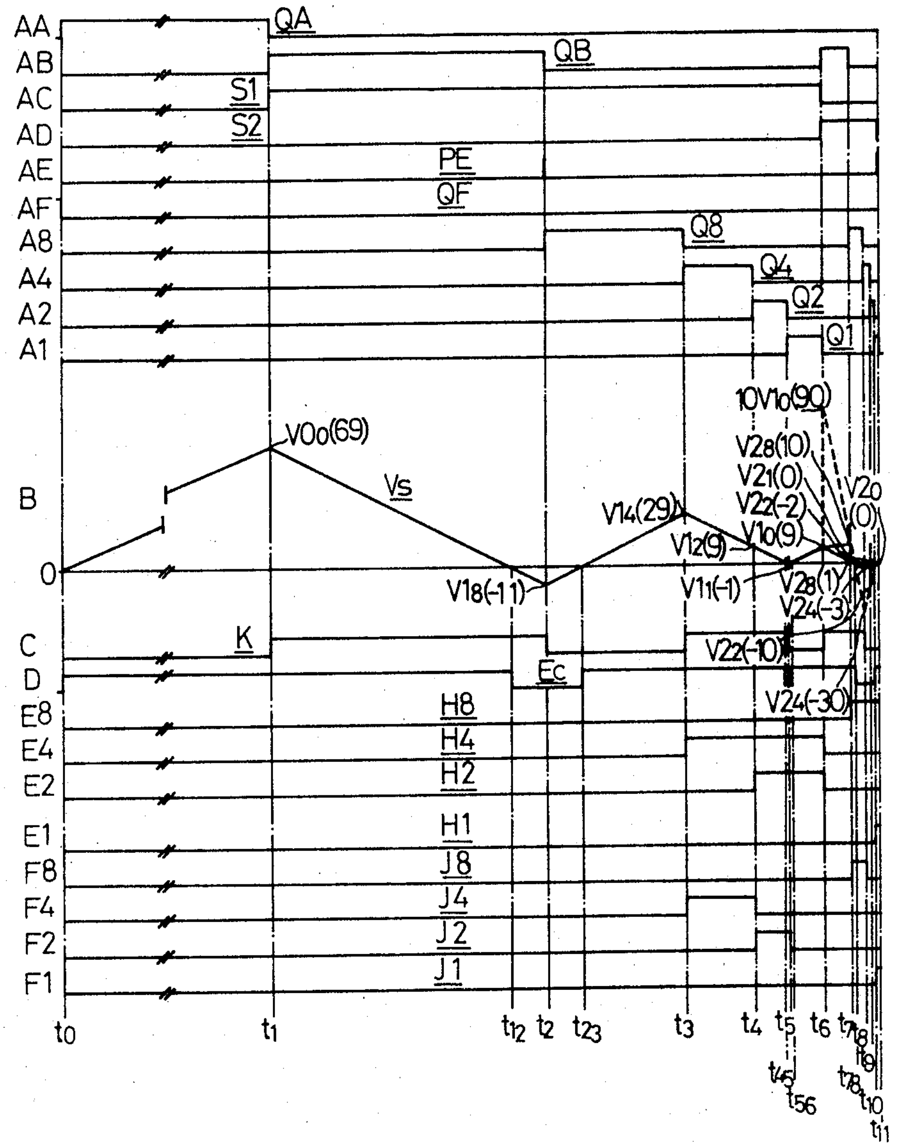

In the event that the analog voltage $V_i$ is ultimately 69 (volts), the values $V0_0$, $V1_8$, $V1_4$, $V1_2$, $V1_1$ and $V1_0$ of the integrated output $V_s$ at the times $t_1$, $t_2$, $t_3$, $t_4$, $t_5$ and $t_6$ are respectively +69, −11, +29, +9, −1 and +9 (volts) based upon the equations (22), (23), (24), (25), (26) and (27) as depicted in FIG. 6. The values $V2_8$, $V2_4$, $V2_2$, $V2_1$ and $V2_0$ of the integrated output $V_s$ at the times $t_7$, $t_8$, $t_9$, $t_{10}$ and $t_{11}$ are respectively +1, −3, −1, 0 and 0 (volt) based upon the equations (28), (29), (30), (31) and (32), and it is known that the analog voltage $V_i$ is 69 (volts) as in the case of FIG. 1.

Figure 7:
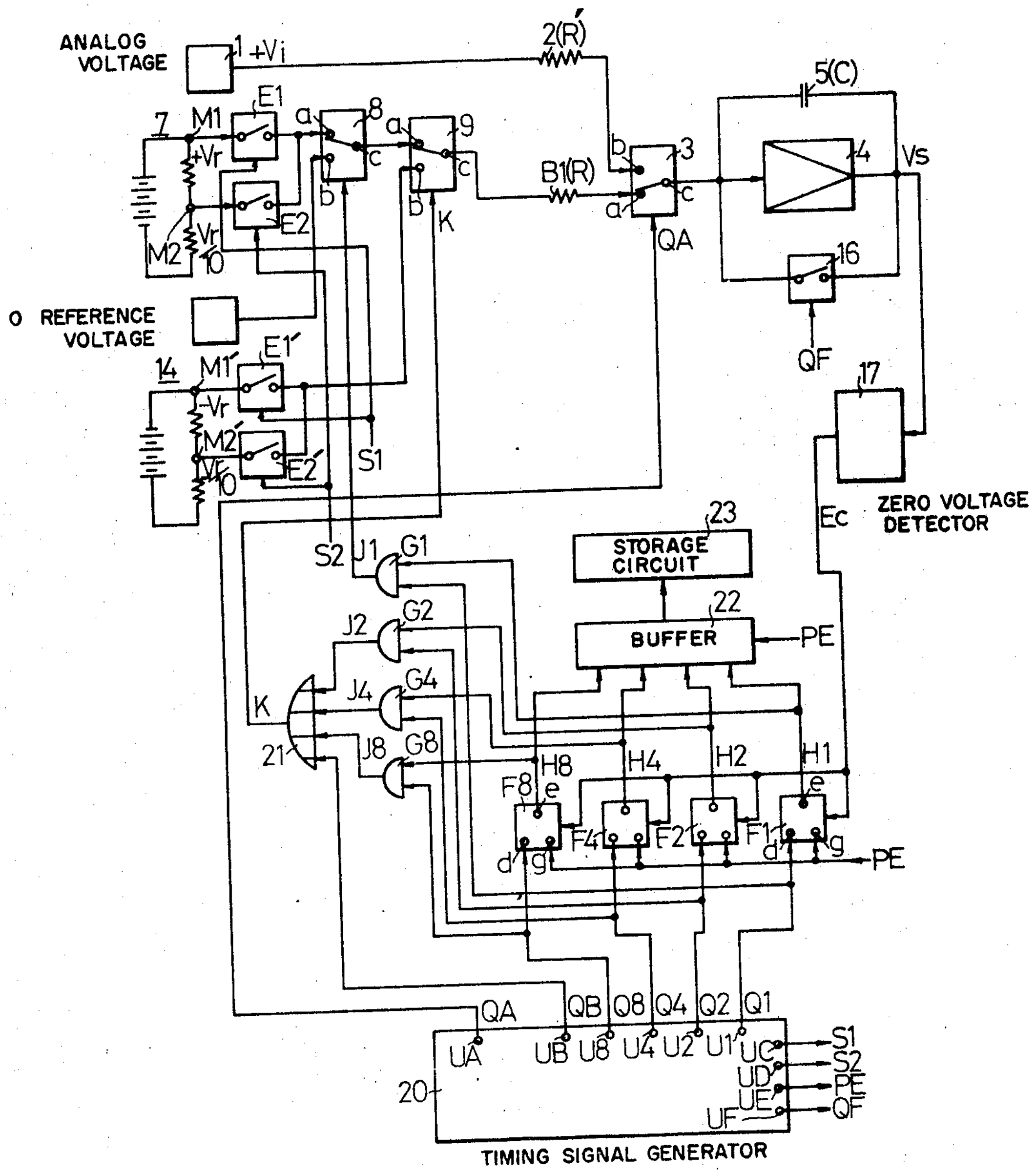
FIGS. 7, 8 and 9 are block diagrams illustrating other modifications of this invention.

Referring now to FIG. 7, another embodiment of this invention will hereinbelow be described. The illustrated example is also identical with that of FIG. 1 except in that the switches D1 and D1 and the resistor B2 are left out, that the contact *c* of the switch 9 is always connected through the resistor B1 to the contact *a* of the switch 3, that a terminal $M_2$ of a voltage $+V_r/10$ is provided in the power source 7 in addition to the terminal $M1_1$ of the voltage $+V_r$, the terminals $M_1$ and $M_2$ being respectively connected to the contact *a* of the switch 8 through switches E1 and E2, that a terminal M2′ of a voltage $-V_r/10$ is provided in the power source 14 in addition to the terminal M1′ of the voltage $-V_r$, the terminals $M_1'$ and $M_2'$ are connected to the contact *b* of the switch 9 respectively through switches E1′ and E2′, and that the switches E1 and E1′, and E2 and E2′ are respectively controlled by the rectangular waves S1, and S2 to be closed. Accordingly, elements corresponding to those in FIG. 1 are identified by the reference numerals and characters and will not be described in detail. In the case where the analog voltage $V_i$ is ultimately 99 (volts), the values $V0_0$, $V1_8$, $V1_4$, $V1_2$, $V1_1$ and $V1_0$ of the integrated output $V_s$ at the times $t_1$, $t_2$, $t_3$, $t_4$, $t_5$ and $t_6$ are respectively +99, +19, −21, −1, +9 and +9 (volts) based upon the equations (1), (2), (4), (6), (8) and (10) respectively as shown in FIG. 2. The values $V2_8$, $V2_4$, $V2_2$, $V2_1$ and $V2_0$ of the integrated value $V_s$ at the times $t_7$, $t_8$, $t_9$, $t_{10}$ and $t_{11}$ are respectively +1, −3, −1, 0 and 0 (volts) based upon the following equations, $$-\frac{1}{RC}\int_0^T \frac{V_r}{10}dt=-\frac{V_8}{10} \quad (33)$$

$$-\frac{1}{RC}\int_0^{\frac{T}{2}} \frac{V_r}{10}dt=-\frac{V_4}{10} \quad (34)$$

$$\frac{1}{RC}\int_0^{\frac{T}{4}} \frac{V_r}{10}dt=\frac{V_2}{10} \quad (35)$$

$$\frac{1}{RC}\int_0^{\frac{T}{8}} \frac{V_r}{10}dt=\frac{V_1}{10} \quad (36)$$

$$\frac{1}{RC}\int_0^{\frac{T}{8}} V_0 dt=V_0 \quad (37)$$

and it is known that the analog voltage $V_i$ is 99 (volts) as in the case of FIG. 1.

Further, in the case where the analog voltage $V_i$ is 69 (volts), the values of the integrated output $V_s$ at the times $t_1$, $t_2$, $t_3$, $t_4$, $t_5$ and $t_6$ are respectively +69, −11, +29, +9, −1 and +9 (volts) based upon the equations (22), (23), (24), (25), (26) and (27). While, the values $V2_8$, $V2_4$, $V2_2$, $V2_1$ and $V2_0$ of the integrated output $V_s$ at the times $t_7$, $t_8$, $t_9$, $t_{10}$ and $t_{11}$ are respectively +1, −3, −1, 0 and 0 (volts) based upon the equations (33), (34), (35), (36) and (37). As is the case with FIG. 1, it is known that the analog voltage $V_i$ is 69 (volts).

Figure 8:
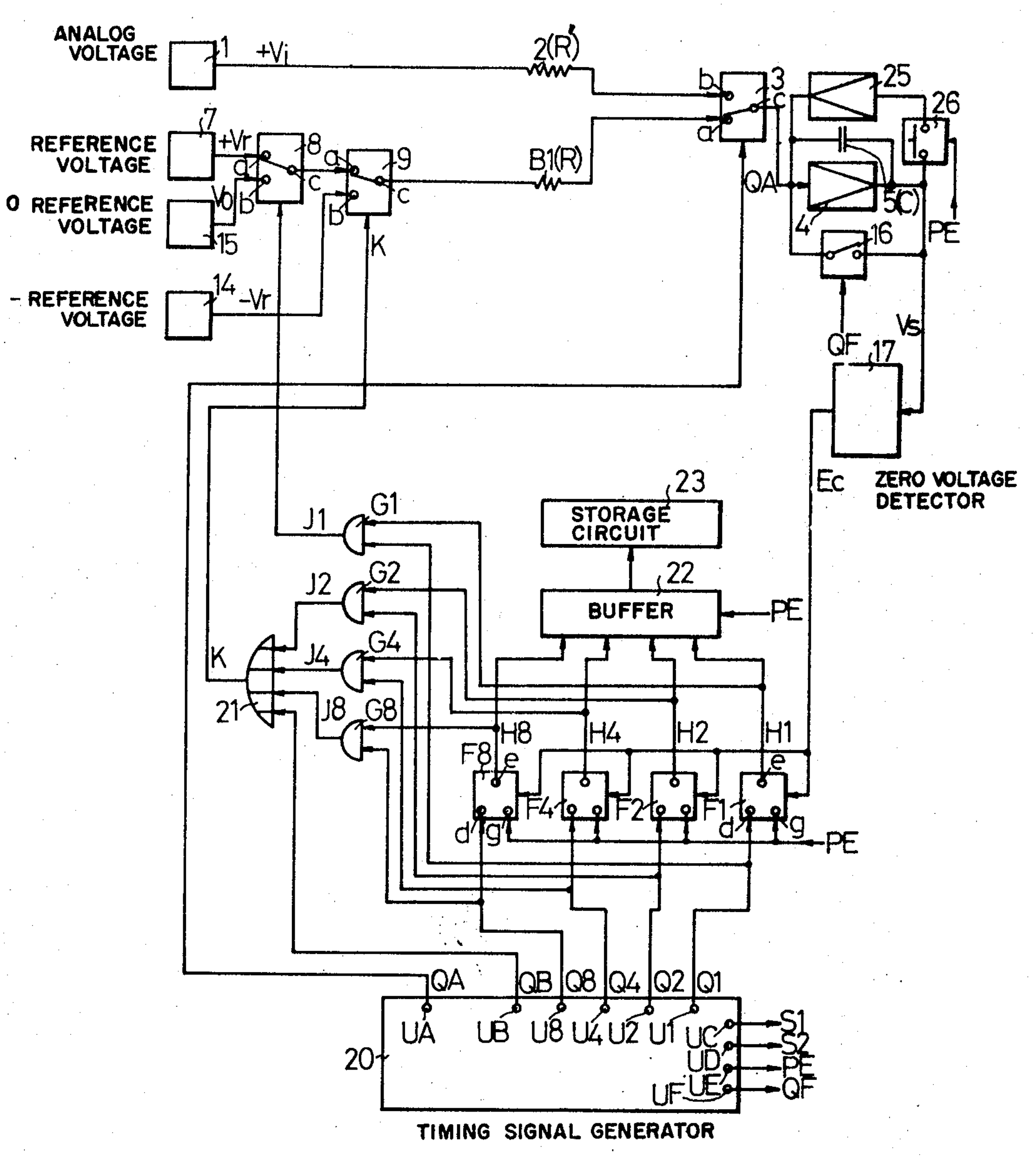

In FIG. 8 there is shown another modification of this invention. In the present example the switches D1 and D2 used in FIG. 1 are omitted, and accordingly the contact *c* of the switch 9 is connected to that *a* of the switch 3 through the resistor B1 but the integrated output $V_s$ of the amplifier 4 is applied to the input side of the amplifier 4 through a switch 26 which is momentarily closed by the pulse PE derived at the times $t_6$ and $t_{11}$ and an amplifier 25, by which the values $V1_0$ and $V2_0$ of the integrated output $V_s$ at the times $t_6$ and $t_{11}$ are respectively rendered to $10V1_0$ and $10V2_0$. When the analog voltage $V_i$ is ultimately 99 (volts) the values $V0_0$, $V1_8$, $V1_4$, $V1_2$, $V1_1$ and $V1_0$ of the integrated output $V_s$ at the times $t_1$, $t_2$, $t_3$, $t_4$, $t_5$ and $t_6$ are respectively +99, +19, −21, +9 and +9 (volts) based upon the equations (1), (2), (4), (6), (8) and (10) as depicted in FIG. 2. While, the value $V1_0$ obtained at the time $t_6$ is momentarily rendered to $10V1_0$, namely 90 (volts) as indicated by broken line, after which the values $V2_8$, $V2_4$, $V2_2$, $V2_1$ and $V2_0$ of the integrated output $V_s$ at the times $t_7$, $t_8$, $t_9$, $t_{10}$ and $t_{11}$ respectively, based upon the equations (2), (4), (6), (8) and (10), +90, − 80 = 10, 10 − 40 = −30, − 30 + 20 = −10, −10 + 10 = 0 and 0 + 0 = 0 (volts) as indicated broken lines in FIG. 2. Thus, it is known that the analog voltage $V_i$ is 99 (volts) as in the case of FIG. 1. In this case, the wave forms at respective parts of the circuit are held unchanged except that of the integrated output $V_s$. The case of the analog voltage $V_i$ being ultimately 69 (volts) is indicated by broken lines in FIG. 3.

Figure 9:
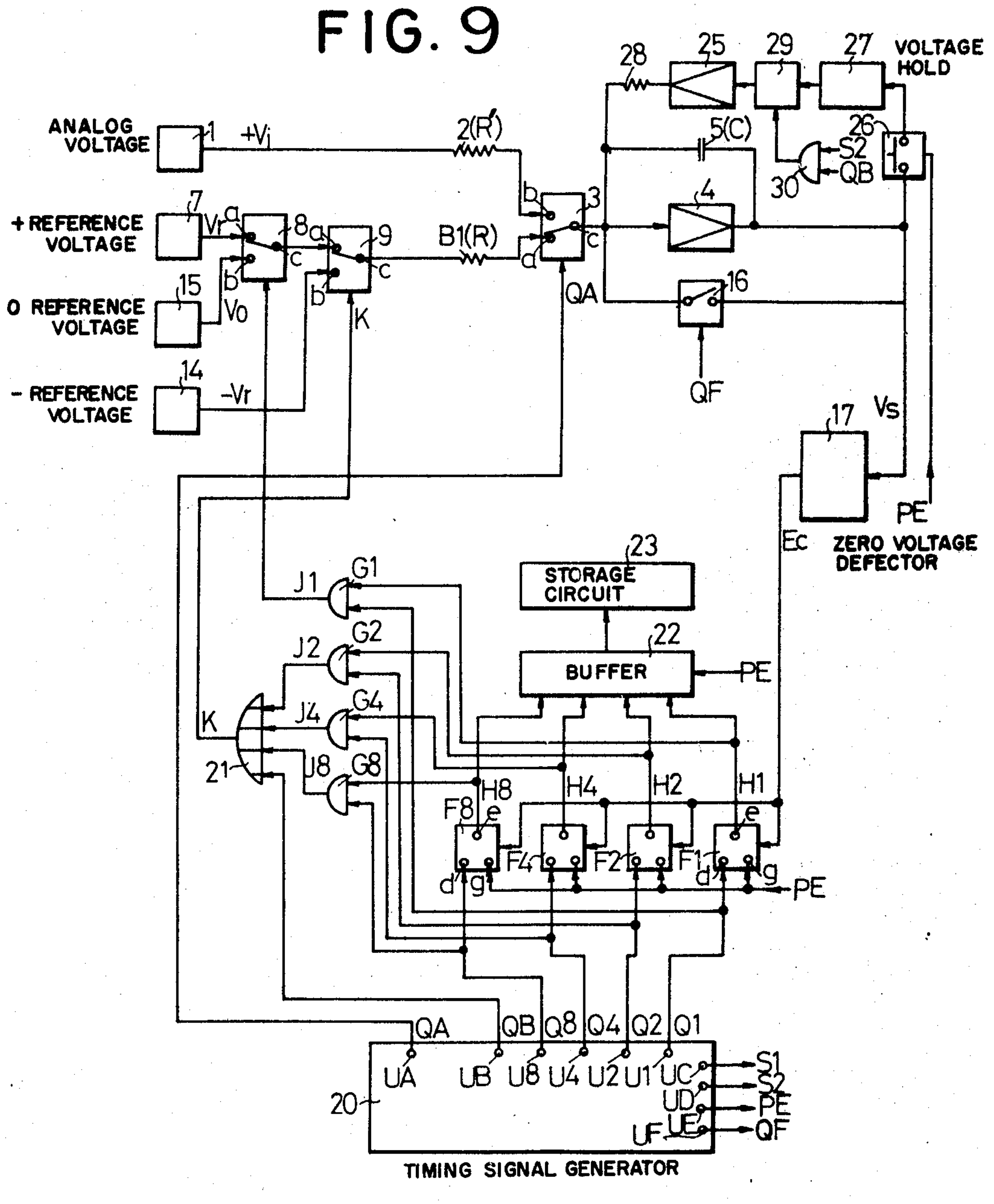

FIGS. 9, illustrates other modified form of this invention which correspond to FIG. 8. In the constructions of FIG. 9 a voltage holding circuit 27 — a gate circuit 29 is interposed between the switch 26 and the amplifier 25 and a resistor 28 is connected between the amplifier 25 and the input side of the amplifier 4. While, the gate circuit 29 is controlled by the output of an AND circuit 30 supplied with the rectangular waves S2 and QB and the values $V1_0$ and $V2_0$ of the integrated output $V_s$ at the times $t_6$ and $t_{11}$ are momentarily supplied to the voltage holding circuit 27 through the switch 26 to thereby hold the values $V1_0$ and $V2_0$ of the integrated output $V_s$ at the times $t_6$ and $t_{11}$. The output, in the present examples, $V1_0$ is supplied to the input side of the amplifier 4 through the amplifier 25 and the resistor 28 while the output of the AND circuit 30 and consequently the rectangular wave QB between the times $t_6$ and $t_7$ is at the level "1." Therefore, if the output voltage of the amplifier 25 is taken as $kV1_0$ ($k$ being a constant) and if the resistance value of the resistor 28 is taken as R′, integration is achieve based upon the following equation.

$$\frac{1}{R''C}\int_{t_6}^{t_7} kV1_0 dt=9V1_0 \quad (97)$$

At the same time, if the voltage fed to the amplifier 4 through the switch 3 between the times $t_6$ and $t_7$ is generally taken as $-V'_r$ and if the value of a resistor connected to the amplifier 4 through the switch 3 is generally taken as $R'''$, the following equation is achieved.

$$-\frac{1}{R'''C}\int_{t_6}^{t_7} V'_r dt \quad (98)$$

As a result, the value $V1_8$ of the integrated output $V_s$ at the time $t_7$ is generally given as follows:

$$V1_8=V1_0-\frac{1}{R'''C}\int_{t_6}^{t_7} V'_r dt+\frac{1}{R''C}\int_{t_6}^{t_7} kV1_0 dt$$
$$=10V1_0-\frac{1}{R'''C}\int_{t_6}^{t_7} V'_r dt \quad (99)$$

Accordingly, subsequent integration is effected so that the value $V1_0$ of the integrated output $V_s$ at the time $t_6$ is momentarily rendered to $10V1_0$ as above described with FIG. 8, thereby obtaining the same effect as the aforementioned.

In such a case, in the example of FIG. 9 the equation (98) is represented by the equation (2), so that the same results as those in the case of FIG. 18 can be obtained except that when the analog voltage $V_i$ is ultimately 99 and 69 (volts) between the times $t_6$ and $t_7$ integration is carried out as indicated by chain lines in FIGS. 2 and 3.

Although the present invention has been given in connection with those examples in which an analog voltage is converted into a two-digit digital output in decimal number, it will be apparent to those skilled in the art that the invention is applicable to the case where a digital output of more than one digit in decimal number is obtained. In the case of obtaining a digital output of one digit, any of the three integration modes from the time $t_1$ to $t_6$ can be adopted; in the case of a digital output of two digits, a combination of one of the three integration modes from $t_1$ to $t_6$ and one of nine integration modes from $t_6$ to $t_{11}$ can be adopted; in the case of a digital output of three digits, a combination of one of the three integration modes from $t_1$ to $t_6$, one of the nine integration modes from $t_6$ to $t_{11}$ and one of nine modes corresponding to the above nine modes from $t_6$ to $t_{11}$ but reducing the amount of integration by one-tenth can be adopted. In this manner, a digital output having any desired number of digits can be obtained with the present invention.

It will be apparent that many modifications and variations may be effected without departing from the scope of the novel concepts of this invention.

I claim as my invention:

1. An integrating A–D conversion method for converting an analog input voltage into a digital output in the form of a binary-coded decimal number each digit of which is represented by a code consisting of first, second, third and fourth bits having weights 8, 4, 2 and 1 respectively, which comprises the sequential steps of, $A_{10}$: integrating a positive (or negative) analog input voltage by first integrating means for a predetermined period of time 2T, to obtain an output, $A_{11}$: reducing the output by integrating a first negative (or positive) reference voltage by the first integrating means for a period of time $T$ and storing a digital signal "1" (or "0") in a first storage means when the output derived from the first integrating means at the end of the step $A_{11}$ is positive (or negative), $A_{12}$: further reducing the remaining output by integrating the first negative (or positive) reference voltage by the first integrating means for a period of time $T/2$ and storing a digital signal "1" (or "0") in a second storage means when an output derived from the first integrating means at the end of the step $A_{12}$ is positive (or negative), $A_{13}$: further reducing the remaining output by integrating the first negative (or positive) reference voltage by the first integrating means for a period of time $T/4$ and storing a digital signal "1" (or "0") in a third storing means when an output derived from the first integrating means at the end of the step $A_{13}$ is positive (or negative), $A_{14}$: further reducing the remaining output by integrating the first negative (or positive) reference voltage by the first integrating means for a period of time $T/8$ and storing a digital signal "1" (or "0") in a fourth storage means when an output derived from the first integrating means at the end of the step $A_{14}$ is positive (or negative), $B_1$: applying digital signals stored in the first, second, third and fourth storage means to the most significant digit portion of a storage and output circuit to store them therein, thereby providing a digital output of a binary-coded decimal number having the most significant digit represented by the digital signals stored in the most significant digit portion of the storage circuit.

2. An integrating A–D conversion method according to claim 1, which further comprises the sequential steps at least $A_{21}$, $A_{22}$, $A_{23}$, $A_{24}$ and $B_2$ following the steps $A_{10}$, $A_{11}$, $A_{12}$, $A_{13}$, $A_{14}$ and $B_1$, in which:

$A_{21}$: further reducing the output by integrating the first negative (or positive) reference voltage by second integrating means for a period of time T and storing a digital signal "1" (or "0") in the first storage means when an output derived from the second integrating means at the end of the step $A_{21}$ is positive (or negative), the second integrating means being the same as the first integrating means except that the integrating constant thereof is ten times that of the first integrating means, $A_{22}$: further reducing the output by integrating the first negative (or positive) reference voltage by the second integrating means for a period of time $T/2$ and storing a digital signal "1" (or "0") in the second storage means when an output derived from the second integrating means at the end of the step $A_{22}$ is positive (or negative), $A_{23}$: further reducing the output by integrating the first negative (or positive) reference voltage by the second integrating means for a period of time $T/4$ and storing a digital signal "1" (or "0") in the third storage means when an output derived from the second integrating means at the end of the step $A_{23}$ is positive (or negative), $A_{24}$: further reducing the output by integrating the first negative (or positive) reference voltage by the second integrating means for a period of time $T/8$ and storing a digital signal "1" (or "0") in the fourth storage means when an output derived from the second integrating means at the end of the step $A_{24}$ is positive (or negative), $B_2$: applying the digital signals stored in the first, second, third and fourth storage means to the less significant digit portion immediately following the most significant one of the storage circuit to store them therein, thereby providing a digital output of a binary-coded decimal number having the most significant digit and the next less significant digit immediately following the most significant one and represented by the digital signals stored in the most significant digit portion and the immediately next less significant digit portion of the storage circuit.

3. An integrating A–D conversion method according to claim 1, which further comprises the sequential steps at least $A_{21}$, $A_{22}$, $A_{23}$, $A_{24}$ and $B_2$ following the steps $A_{10}$, $A_{11}$, $A_{12}$, $A_{13}$, $A_{14}$ and $B_1$, in which, $A_{21}$: further reducing the output by integrating the first negative (or positive) reference voltage by the first integrating means for a period of time $T/10$ and storing a digital signal "1" (or "0") in the first storage means when an output derived from the first integrating means at the end of the step $A_{21}$ is positive (or negative), $A_{22}$: further reducing the output by integrating the first negative (or positive) reference voltage by the first integrating means for a period of time $T/20$ and storing a digital signal "1" (or "0") in the second storage means when an output derived from the first integrating means at the end of the step $A_{22}$ is positive (or negative), $A_{23}$: further reducing the output by integrating the first negative (or positive) reference voltage by the first integrating means for a period of time $T/40$ and storing a digital signal "1" (or "0") in the third storage means when an output derived from the first integrating means at the end of the step $A_{23}$ is positive (or negative), $A_{24}$: further reducing the output by integrating the first negative (or positive) reference voltage by the first integrating means for a period of time $T/80$ and storing a digital signal "1" (or "0") in the fourth storage means when an output derived from the first integrating means at the end of the step $A_{24}$ is positive (or negative), $B_2$: applying the digital signals stored in the first, second, third and fourth storage means to the next less significant digit portion immediately following the most significant one of the storage circuit to store them therein, thereby providing a digital output of a binary-coded decimal number having the most significant digit and the less significant digit immediately following the most significant one and represented by the digital signals stored in the most significant digit portion and the immediately less significant digit portion of the storage circuit.

4. An integrating A–D conversion method according to claim 1, which further comprises the sequential steps at least $A_{21}$, $A_{22}$, $A_{23}$, $A_{24}$ and $B_2$ following the steps $A_{10}$, $A_{11}$, $A_{12}$, $A_{13}$, $A_{14}$ and $B_1$, in which $A_{21}$: further reducing the output by integrating a second negative (or positive) reference voltage by the first integrating means for a period of time T and storing a digital signal "1" (or "0") in the first storage means when an output derived from the first integrating means at the end of the step $A_{21}$ is positive (or negative), the second negative (or positive) reference voltage being the same as the first negative (or positive) reference voltage except that the value thereof is one-tenth of that of the first negative (or positive) reference voltage, $A_{22}$: further reducing the output by integrating the second negative (or positive) reference voltage by the first integrating means for a period of time *T*/2 and storing a digital signal "1" (or "0") in the second storage means when an output derived from the first integrating means at the end of the step $A_{22}$ is positive (or negative), $A_{23}$: further reducing the output by integrating the second negative (or positive) reference voltage by the first integrating means for a period of time *T*/4 and storing a digital signal "1" (or "0") in the third storage means when an output derived from the first integrating means at the end of the step $A_{23}$ is positive (or negative), $A_{24}$ : further reducing the output by integrating the second negative (or positive) reference voltage by the first integrating means for a period of time *T*/80 and storing a digital signal "1" (or "0") in the fourth storage means when an output derived from the first integrating means at the end of the step $A_{24}$ is positive (or negative), $B_2$: applying the digital signals stored in the first, second, third and fourth storage means to the less significant digit portion immediately following the most significant one of the storage circuit to store them therein, thereby providing a digital output of a binary-coded decimal number having the most significant digit and the less significant digit immediately following the most significant one and represented by the digital signals stored in the most significant digit portion and the immediately less significant digit portion of the storage circuit.

5. An integrating A–D conversion method according to claim 1, which further comprises the sequential steps of C, $A_{21}$, $A_{22}$, $A_{23}$, $A_{24}$, and $B_2$ following the steps $A_{10}$, $A_{11}$, $A_{12}$, $A_{13}$, $A_{14}$ and $B_1$, in which C: increasing the output voltage of the first integrating means to a voltage the value of which is ten times that of the output voltage obtained at the end of the step $A_{14}$ , $A_{21}$: reducing the increased voltage by integrating the first negative (or positive) reference voltage by the first integrating means for a period of time T and storing a digital signal "1" (or "0") in the first storage means when an output derived from the first integrating means at the end of the step $A_{21}$ is positive (or negative), $A_{22}$: further reducing the output by integrating the first negative (or positive) reference voltage by the first integrating means for a period of time *T*/2 and storing a digital signal "1" (or "0") in the second storage means when an output derived from the first integrating means at the end of the step $A_{22}$ is positive (or negative), $A_{23}$: further reducing the output by integrating the first negative (or positive) reference voltage by the first integrating means for a period of time *T*/4 and storing a digital signal "1" (or "0") in the third storage means when an output derived from the first integrating means at the end of the step $A_{23}$ is positive (or negative), $A_{24}$: further reducing the output by integrating the first negative (or positive) reference voltage by the first integrating means for a period of time *T*/8 and storing a digital signal "1" (or "0") in the fourth storage means when an output derived from the first integrating means at the end of the step $A_{24}$ is positive (or negative), $B_2$: applying the digital signals stored in the first, second, third and fourth storage means to the less significant digit portion immediately following the most significant one of the storage circuit to store them therein, thereby providing a digital output of a binary-coded decimal number having the most significant digit and the less significant digit immediately following the most significant one and represented by the digital signals stored in the most significant digit portion and the immediately less significant digit portion of the storage circuit.

* * * * *